Aug. 15, 1961   R. R. BOCKEMUEHL   2,996,620
SPEED MEASURING SYSTEM
Filed June 12, 1957
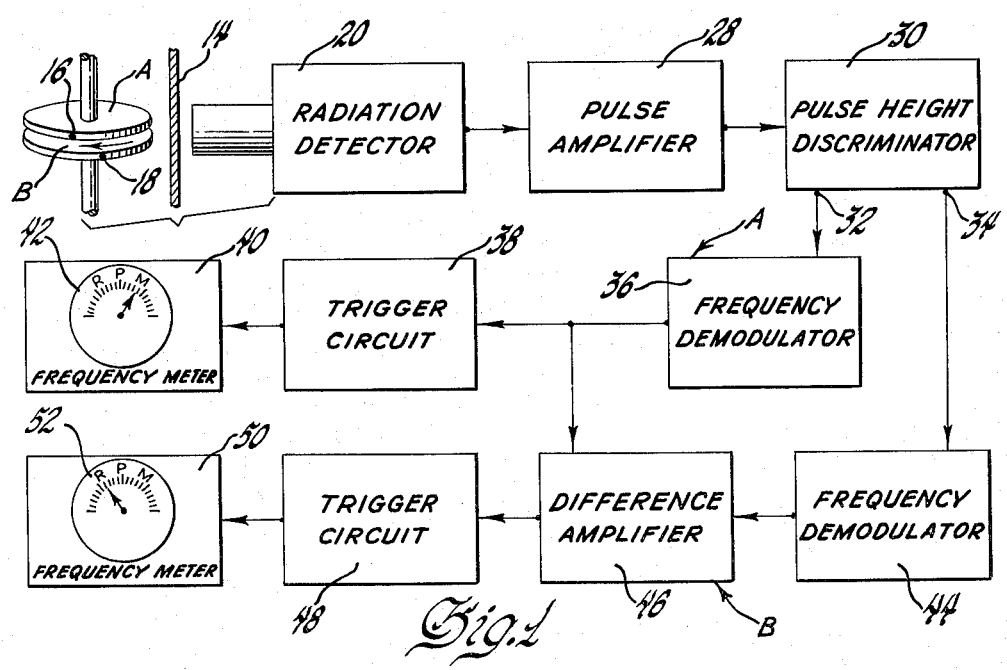
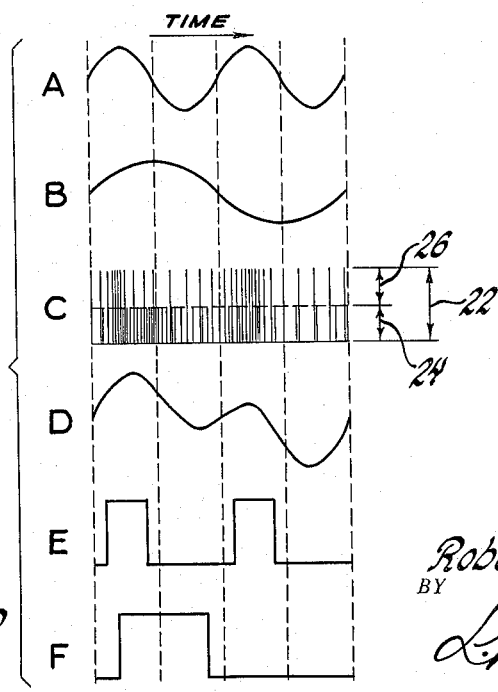
Fig. 1
Fig. 2
INVENTOR.
Robert R. Bockemuehl
BY
ATTORNEY United States Patent Office 2,996,620
Patented Aug. 15, 1961

2,996,620
SPEED MEASURING SYSTEM
Robert R. Bockemuehl, Birmingham, Mich., assignor to General Motors Corporation, Detroit, Mich., a corporation of Delaware
Filed June 12, 1957, Ser. No. 665,323
8 Claims. (Cl. 250—83.3)

The present invention relates to tachometers and more particularly to means for simultaneously measuring the rotation of a pair of relatively rotating members.

The most convenient means of measuring the angular rotation of a moving member is to employ a device that requires physical connection with the moving member or at least means for visually observing at least a portion of the member. However, it has been found that in certain instances, due to space limitations and other facts, it is impossible or impractical to employ such measuring means. Accordingly, it has been proposed to provide the rotating member with a piece of radioactive material and to employ a remotely located detector for observing the movement of the radioactive material. Although this has been found satisfatcory when observing a single rotating member, it is frequently desirable to measure the rotation of two independently rotatable members located in juxtaposition to each other. Under such circumstances, if both members are equipped with a piece of radioactive material, the radiation from the two pieces overlaps each other and it is difficult to determine the individual movements of the two members.

It is now proposed to provide means for simultaneously measuring the individual rotation of a pair of relatively rotating members by means which may be located remote from the moving members. More particularly, this is to be accomplished by providing each of the rotating members with a piece of radioactive material and providing a radiation detector which is adapted to detect the radiation from the two particles as they rotate therepast. The two pieces of radioactive material are of different isotopes, the radiations from which have different energy levels. Although the average count rate of gamma rays for each of the pieces of radioactive material may be substantially equal, the energy of the radiations from the two particles are as widely separated as possible. Thus a radiation detector such as a scintillation head will produce pulses of different magnitude when subjected to the radiations from the different sources. The detector is operatively interconnected with a pulse discriminator adapted to distinguish between the pulses produced by the different sources of radiation. The discriminator has one output that feeds a signal from one source into a first rate meter and a second output that feeds a signal from the other source into another rate meter. These two rate meters are calibrated to indicate the speed of rotation of the two members. As a result it is possible to remotely detect and indicate the individual speeds of a pair of separately rotating juxtaposed members.

In order to separate the pulse train into separate components representing the radiations of different energies, it has been found advantageous to provide a discriminator having one output which contains the information from only one of the components. The discriminator also includes another output having all of the components representing the information from the entire pulse train. The output having only one component may then be subtracted from the output having the combined signal to produce a signal representing the difference between the two signals or in other words the second component. As a result the two individual components may be readily obtained.

In the one sheet of drawings:
FIGURE 1 is a block diagram of a system embodying the present invention.
FIGURE 2 is a view of a series of wave forms located at various points in the system.

Referring to the drawing in more detail, the present invention may be adapted to measure the speed of rotation of any number of relatively rotating members. In the present instance it is employed to measure the speed of a first rotating member A and a second rotating member B. These members A and B are disposed in juxtaposition to each other and are free to rotate relative to each other. Although these members A and B may be readily accessible, the present invention is particularly adapted to be used for measuring the movement of rotating members A and B when they are in an inaccessible location. For example, these members A and B may be a pair of gears or similar elements that are disposed inside of a housing 14 so that it is difficult, if not impossible, to attach a conventional tachometer device thereto.

The first member A is provided with a piece 16 of radioactive material adjacent the periphery thereof so that it will travel in a circular path during rotation of the first member A. The second member B is also provided with a piece 18 of radioactive material adjacent the periphery thereof so that it will travel in a second circular path in juxtaposition to the first path during rotation of the second member B.

The pieces 16, 18 of radioactive material are two different isotopes having radiations with different energy levels. Although the radiations will have a random fluctuation, the amount of the fluctuation can be reduced by increasing the count rates of the pieces 16, 18 of radioactive material as much as possible. Since the upper limit is determined by the ability of the electronic circuit to handle the resultant pulses and since the detecting means is subject to radiation of both pieces 16, 18, the average of both pieces is substantially equal and half the total maximum amount. For example, one piece 16 of material might comprise two millicuries of cobalt-60 which has a particle energy of 1.33 and 1.17 mev. The other piece 18 could then comprise six millicuries of cesium-137 which has a particle energy of .662 mev. It may be seen that these two pieces 16, 18 of radioactive material will have substantially identical count rates but there will be a very wide separation in the energy levels of the radiations from the two different sources.

In order to observe the rotation of the two members A and B, a radiation detecting means 20 is provided remote from the rotating members A and B. It should be noted that in the event the rotating members A and B are encased in a housing 14 so as to be inaccessible, the detecting means 20 may be disposed outside of the housing 14.

Although the radiation detecting means 20 may be of any suitable type, in the present instance it comprises a sodium iodide scintiallation crystal which produces a flash of light for each gamma ray passing therethrough and a photomultiplier tube which observes the flashes and converts them into electrical pulses. The number of light flashes are proportional to the number of gamma rays absorbed per unit time while the brilliance of the flashes are proportional to the energy level of the gamma rays which enter the crystal. Therefore, the electrical pulses out of the photomultiplier tube are proportional in amplitude to the gamma ray energy and proportional in number of the number of gamma rays entering per unit time.

When the rotating members A and B are at a standstill, the output pulses from the scintillation detector 20 have an average count rate equal to the total of the two isotopes combined. However, when one or both of the members A or B rotate, the pieces 16, 18 of radioactive material will pass the detector 20 once each revolution of the member A or B carrying it. The pulse train 22 from the pickup 20 will comprise a first series of small or low amplitude pulses 24 which are produced by the low energy level source B and a second series of larger or high amplitude pulses 26 which are produced by the high energy level source A. Thus the pulse train 22 produced in the detector 20 comprising a series of pulses 24 and 26 from each of the pieces 16, 18 of radioactive material will be pulse rate or frequency modulated. The pulse rate in each series 24, 26 will reach a maximum when the piece of radioactive material is closest to the pickup and a minimum when the piece is most remote therefrom and the modulating frequencies will be proportional to the speeds of rotation of the member A or B.

The photomultiplier tube is interconnected with the input to a linear pulse amplifier 28 that amplifies the individual pulses in the pulse train 22 to a more useful level. The output of this amplifier 28 is, in turn, interconnected with a pulse height discriminator 30 and feeds the pulse train 22 with its large and small amplitude pulses into the discriminator 30.

The discriminator 30 is responsive to the amplitude of the pulses and has a pair of outputs 32, 34, one of which is connected to the A channel and the other of which is connected to the B channel. The sensitivity of the discriminator 30 is set so that a pulse will appear in the A channel output only as a result of pulses having an amplitude in excess of that for the pulses from the low energy source. However, the B channel output contains a mixture of both the low and high amplitude pulses produced by both sources of radiation.

The A channel comprises a frequency demodulating circuit 36 connected to the A channel output 32 and adapted to produce a varying D.C. signal, the amplitude of which at any given instance is proportional to the frequency of the pulses at that instance. The output of this demodulator 36 is interconnected with a trigger circuit 38 responsive to the D.C. signal and adapted to produce a square wave signal (FIGURE 2E), having a pulse for each cycle of the D.C. signal. A frequency meter 40 is interconnected with the trigger circuit 38 to receive the square wave signal and indicate the frequency thereof on the face 42 of the meter. Since the frequency of the square wave will correspond to the speed of rotation of the member A, this meter 40 may be calibrated to read directly the revolutions per minute thereof.

The B channel comprises a frequency demodulating circuit 44 similar to that in the A channel that is connected to the output 34 of the discriminator 30. This demodulating circuit 44 is adapted to produce a varying D.C. signal, the amplitude of which at any given instant is proportional to the frequency of the pulses. This will produce a signal such as shown in FIGURE 2D. Since this signal is a combination of the information radiated by both the high and low level sources 16, 18, a difference amplifier 46 is fed from the demodulator 44 and also receives a signal from the first frequency demodulator 36. This amplifier 46 subtracts the A signal from the combined signal and thus produces a signal containing only information from the B source such as shown in FIGURE 2B. This signal is fed into a trigger circuit 48 which is adapted to produce a square wave signal having a pulse for each cycle of the input signal (FIGURE 6F). This square wave, in turn, is fed to a frequency meter 50 that indicates the frequency of the square wave on the face 52 thereof. Since this frequency will correspond to the rotational speed of the rotating member B, this meter 50 may be calibrated to read revolutions per minute.

It may thus be seen that a tachometer device has been provided which is particularly adapted to measuring the rotational speed of a pair of juxtaposed members which are not readily accessible. This means includes a radiation detector which may be disposed outside of the housing enclosing the rotating members so as to receive the radiations therefrom and to produce two separate, continuous and instantaneous readings of the rotational speed of these members.

It is to be understood that, although the invention has been described with specific reference to a particular embodiment for measuring the speed of rotation of a pair of members, it may be adapted to measure the speed of any number of relatively rotating parts. Accordingly, it is not to be limited to the specific embodiment disclosed since changes and alterations therein may be made which are within the full intended scope of this invention as defined by the appended claims.

I claim.

1. Means for simultaneously measuring the individual rotational speeds of a first rotating member having a radioactive source with a relatively high energy level, a second rotating member having a radioactive source with a relatively low energy level, said means comprising a radiation detector positioned adjacent said members to sense the radiation from said sources and to produce a signal having components the amplitudes of which correspond to the energy levels of the sources, a discriminator responsive to said signal and having a pair of separate channels and being adapted to separate the high and low level components into separate channels, each of said channels having indicating means therein for indicating the individual speed of one of said members.

2. The combination of a first member having a source of radioactivity thereon, a second member having a second source of radioactivity thereon with an energy level higher than said first source, a radiation detector disposed adjacent said members and adapted to sense the radiations from said sources and to produce a signal having a component resulting from movement of the low energy source and a component resulting from movement of said high energy source, discriminating means having separate channel outputs and being adapted to separate said components so that each of said channels has only one of said components therein, an indicator in each of said channels for separately indicating the individual speeds of said members.

3. Means for simultaneously measuring the individual rotational speeds of a first member having a source of radioactivity thereon and a second member having a source of radioactivity thereon with an energy level differing from that of said first source, a radiation detector disposed adjacent said members to sense the radiations from both of said sources, means operatively interconnected with said detector and having one output signal representing the radiations from one source and another output representing the combined radiations from both sources, means for subtracting said output signal from said combined output to produce a resultant signal, means for determining the frequencies of said signals.

4. Apparatus for simultaneously measuring the individual rotational speeds of a first member having a first source of radioactivity thereon and a second member having a second source of radioactivity thereon with an energy level differing from that of said first source, a radiation detector disposed adjacent said members to sense the radiations from said first and second sources, means operatively interconnected with said detector and adapted to produce a first output signal corresponding to radiations from said first source and a second output signal corresponding to radiations from both said first and second sources, means for subtracting said first signal from said second signal to produce a third output signal corresponding to radiations from said second source, and means for individually determining the frequencies of said first and third output signals.

5. Apparatus for simultaneously measuring the individual rotational speeds of a first member having a source of radioactivity thereon of a first energy level and a second member having a source of radioactivity thereon of a second energy level, a radiation detector disposed adjacent said members to sense radiations from said first and second sources and to produce a series of electrical pulses having a first pulse height corresponding to radiation of said first energy level and a second pulse height corresponding to radiation of said second energy level, a pulse height discriminator operatively interconnected with said detector for producing a first pulse train representing pulses of said first height and a second pulse train representing pulses of both said first and second heights, a first demodulator responsive to said first pulse train to produce a first output signal having a magnitude proportional to the repetition rate of pulses in said first pulse train, a second demodulator responsive to said second pulse train to produce a second output signal having a magnitude proportional to the repetition rate of pulses in said second pulse train, means for subtracting said first output signal from said second output signal to produce a third output signal, and means for individually determining the frequency of variations in the magnitudes of said first and said third signals.

6. Apparatus for simultaneously measuring the individual rotational speeds of a first member having a source of radioactivity thereon of a first energy level and a second member having a source of radioactivity thereon of a second energy level, a radiation detector disposed adjacent said members to sense radiations from said sources and to produce a series of electrical pulses having a first pulse height corresponding to radiations of said first energy level and a second pulse height corresponding to radiation of said second energy level, a pulse height discriminator operatively interconnected with said detector for producing a first pulse train representing pulses of said first height and a second pulse train representing pulses of both said first and second heights, a first demodulator connected to said discriminator and responsive to said first pulse train to produce a first output signal having a magnitude proportional to the repetition rate of pulses in said first pulse train, a second demodulator connected to said discriminator and responsive to said second pulse train to produce a second output signal having a magnitude proportional to the repetition rate of pulses in said second pulse train, subtracting means connected to said first and second demodulators to receive said first and second output signals and adapted to subtract said first output signal from said second output signal to produce a third output signal, a first indicating means connected to said first demodulator to receive said first output and adapted to indicate the frequency of variations in the magnitude thereof, and a second indicating means connected to said subtracting means to receive said third output signal and adapted to indicate the frequency of variations in the magnitude thereof.

7. In apparatus for simultaneously measuring the individual rotational speeds of a first member having a first source of radiations thereon and a second member having a second source of radiations thereon which differ in character from the radiations of said first source, radiation detection means positioned to sense the radiation from said sources and to produce an electrical output having a first component corresponding to radiations of said first source and a second component corresponding to radiations of said second source, discriminating means connected to said detection means to receive said electrical output and adapted to produce a first output signal corresponding to said first component only and to produce a second output signal corresponding to said second component only, and first and second frequency responsive means connected to said discriminating means to receive said first and second output signals respectively.

8. In apparatus for simultaneously measuring the individual rotational speeds of first and second rotating members wherein said first member has a radioactive source mounted thereon to emit radiations of a first character and said second member has a radioactive source mounted thereon to emit radiations of a second character, radiation detection and discriminating means positioned to sense the radiations from said sources and adapted to produce a first output signal representing radiations of said first character and a second output signal representing radiations of said second character, and first and second indicating means connected to receive said first and second output signals respectively and adapted to provide an indication of the frequency of variations in the magnitude thereof.

References Cited in the file of this patent

UNITED STATES PATENTS

| | | |
|---|---|---|
| 2,412,165 | McDermott | Dec. 3, 1946 |
| 2,683,813 | Friedman | July 13, 1954 |
| 2,692,951 | Voelker | Oct. 26, 1954 |
| 2,751,506 | Black et al. | June 19, 1956 |
| 2,810,828 | Gray | Oct. 22, 1957 |
| 2,811,650 | Wagner | Oct. 29, 1957 |
| 2,821,626 | Freedman | Jan. 28, 1958 |